(12) United States Patent
Di Noto et al.

(10) Patent No.: US 9,577,278 B2
(45) Date of Patent: Feb. 21, 2017

(54) HYBRID MEMBRANES CONTAINING TITANIUM DIOXIDE DOPED WITH FLUORINE

(71) Applicant: BRETON SPA, Castello di Godego (TV) (IT)

(72) Inventors: Vito Di Noto, Cadoneghe (IT); Nicola Boaretto, Padua (IT); Enrico Negro, Treviso (IT); Mauro Bettiol, Giavera del Montello (IT); Fabio Bassetto, Monticello Conte Otto (IT)

(73) Assignee: BRETON SPA, Castello di Godego (TV) (IT)

( * ) Notice: Subject to any disclaimer, the term of this patent is extended or adjusted under 35 U.S.C. 154(b) by 0 days.

(21) Appl. No.: 14/868,953

(22) Filed: Sep. 29, 2015

(65) Prior Publication Data

US 2016/0087302 A1  Mar. 24, 2016

Related U.S. Application Data

(62) Division of application No. 13/814,353, filed as application No. PCT/IB2011/053261 on Jul. 21, 2011, now Pat. No. 9,184,460.

(30) Foreign Application Priority Data

Aug. 6, 2010 (IT) .............................. TV2010A0115

(51) Int. Cl.
| | |
|---|---|
| *H01M 8/10* | (2016.01) |
| *B01D 67/00* | (2006.01) |
| *B01D 69/14* | (2006.01) |
| *C25B 9/08* | (2006.01) |
| *C25B 13/04* | (2006.01) |
| *C25B 13/08* | (2006.01) |
| *B01D 71/02* | (2006.01) |

(52) U.S. Cl.
CPC ........ *H01M 8/1016* (2013.01); *B01D 67/0044* (2013.01); *B01D 67/0076* (2013.01); *B01D 67/0079* (2013.01); *B01D 69/148* (2013.01); *B01D 71/024* (2013.01); *C25B 9/08* (2013.01); *C25B 13/04* (2013.01); *C25B 13/08* (2013.01); *H01M 8/1048* (2013.01); *B01D 2323/08* (2013.01); *B01D 2323/26* (2013.01); *B01D 2323/48* (2013.01); *B01D 2325/26* (2013.01); *B01D 2325/42* (2013.01); *H01M 2300/0071* (2013.01); *H01M 2300/0082* (2013.01); *H01M 2300/0091* (2013.01); *Y02E 60/521* (2013.01); *Y02P 70/56* (2015.11)

(58) Field of Classification Search
CPC ............. H01M 8/1016; H01M 8/1048; H01M 2300/0071; H01M 2300/0082; H01M 2300/0091; B01D 67/0044; B01D 67/0079; B01D 67/0076; B01D 69/149; B01D 71/024; B01D 2325/26; B01D 2323/08; B01D 2323/26; B01D 2323/42; B01D 2323/48; C25B 9/08; C25B 13/04; C25B 13/08; Y02E 60/521
USPC ........................................................ 521/27
See application file for complete search history.

(56) References Cited

U.S. PATENT DOCUMENTS

| | | | |
|---|---|---|---|
| 5,091,252 A | 2/1992 | Hruska et al. | |
| 5,597,515 A | 1/1997 | Kauffman et al. | |
| 7,661,542 B2 | 2/2010 | Baurmeister et al. | |
| 7,713,899 B2 | 5/2010 | Hampden-Smith et al. | |
| 8,828,541 B2 * | 9/2014 | Bettiol .................. | C01G 23/047 428/402 |
| 9,184,460 B2 * | 11/2015 | Di Noto ............. | B01D 67/0044 |
| 2008/0248356 A1 | 10/2008 | Kimura et al. | |

FOREIGN PATENT DOCUMENTS

| | | |
|---|---|---|
| CN | 101359743 | 2/2009 |
| WO | 2005090235 | 12/2005 |
| WO | 2006077203 | 7/2006 |
| WO | 2007092097 A3 | 4/2008 |
| WO | 2009113045 | 12/2009 |

OTHER PUBLICATIONS

Di Noto et al. "Hybrid inorganic-organic proton conducting membranes based on Nation and 5 wt% of MxOy (M=Ti, Zr, Hf, Ta and W). Part II: Relaxation phenomena and conductivity mechanism", J. of Power Sources, (2009), vol. 187, 57-66.*
Vito Di Noto et al. "New inorganic-organic proton conducting membranes based on Nafion and hydrophobic fluoroalkylated silica nanoparticles", J. of Power Sources, (2010), vol. 195, 7734-7742.*
Di Noto et al. "Hybrid inorganic-organic proton conducting membranes based on Nation and 5 wt% of MxOy (M=Ti, Zr, Hf, Ta and W). Part I1: Relaxation phenomena and conductivity mechanism", J. of Power Sources, (2009), vol. 187, 57-66.*
Vito et al., "New inorganic-organic proton conducting membranes based on Nafion and hydrophobic fluoroalkylated silica nanoparticles", J. of Power Sources, (2010), vol. 195, pp. 7734-7742.
Li et al., "Fluorine-doped Ti02 powders prepared by spray pyrolysis and their improved photocatalytic activity for decomposition of gas-phase acetaldehyde," Journal of Fluorine Chemistry, Elsevier, NL., vol. 126, No. 6, Jan. 1, 2005, pp. 69-77.
Yu et al., "One-step hydrothermal fabrication and photocatalytic activity of surface-fluorinated TiO2 hollow microspeheres and tabular anatase single micro-crystals with high-energy facets", CrystEngComm, (2010), vol. 12, pp. 872-879.
"International Search Report dated Oct. 24, 2011 for related International Application No. PCT/IB2011/053260," 4 pgs.
Cappadonia et al., "Fuel Cells," Ullmann's Encyclopedia of Industrial Chemistry (2005), pp. 1-23.
"International Search Report dated Oct. 27, 2011 for PCT/IB2011/053261, from which the instant application is based," 3 pgs.

(Continued)

*Primary Examiner* — Michael M Bernshteyn
(74) *Attorney, Agent, or Firm* — Fredrikson & Byron, P.A.

(57) ABSTRACT

Hybrid membranes based on crystalline titanium dioxide containing fluorine atoms within the crystalline lattice comprising atoms of titanium and oxygen are described; these hybrid membranes are particularly suitable for the production of fuel cells and electrolysers. A process for producing the aforesaid hybrid membranes is also described.

3 Claims, 11 Drawing Sheets

(56) References Cited

OTHER PUBLICATIONS

"Search Report and Written Opinion dated Mar. 28, 2011 for related application IT TV20100115, including English translation," 8 pgs.
Liao et al., "Fabrication of porous biodegradable polymer scaffolds using a solvent merging/particulate leaching method," Porous Biodegradable Polymer Scaffolds (2001), pp. 676-681.
Todorova et al., "Structure tailoring of fluorine-doped TiO2 nanostructured powders," Materials Science and Engineering B., Elsevier Sequoia, Lausanne, CH, vol. 152, No. 1-3, Aug. 25, 2008, pp. 50-54.
Grot, Flurinated Ionomers, 2008, pp. 113-116.
Czoska et al., "The nature of defects in fluorine doped TiO2," Journal of Physical Chemistry, vol. 112, May 27, 2008, pp. 8951-8956.
Yang et al., Synthesis, characterization and computational simulation of visible-light irradiated fluorine-doped titanium oxide thin films, Journal of Materials Chemistry 19 (2009), pp. 6907-6914.
Chen et al., "Nafion/PTFE and zirconium phosphate modified Nafion/PTFE composite membranes for direct methanol fuel cells," Journal of Membrane Science 307 (3008), pp. 10-20.
Hsieh et al., "Fabrication and superhydrophobicity of fluorinated titanium dioxide nanocoatings," Journal of Colloid and Interface Science, vol. 340, Aug. 21, 2009, pp. 237-242.
Di Noto et al., "Hybrid inorganic-organic proton conducting membranes based on Nafion and t wt% of MxOy (M—Ti, Zr, Hf, Ta and W). Part II: Relaxation phenomena and conductivity mechanism," Journal of Power Sources, 187 (2009) pp. 57-66.
Spiegel, Designing & Building Fuel Cells, 2007, pp. 346-348.
Di Noto et al., "New inorganic-organic proton conducting membranes based on Nafion and [ZrO2] (SiO2)0.67] nanoparticles: Synthesis vibrational stuside and conductivity," Journal of Power Sources 178 (2008), pp. 561-574.
"Search and Written Opinion dated Feb. 24, 2011 for related application IT TV201000114, including English translation," 9 pgs.
Lee et al., "Highly visible photocatalytic activity of fluorine and nitrogen co-doped nanocrystalline anatase phase titanium oxide converted from ammonium oxotrifluorotitanate," IEEE Transactions on Nanotechnology, IIII Service Center, Piscataway, NJ, US, vol. 6, No. 3, May 1, 2007, pp. 316-219.

* cited by examiner

HR-TEM image

Detail of the HR-TEM image, showing the interplanar distances of the nanocrystals of anatase in FT, equal to 2.4 Å.

HYBRID MEMBRANES CONTAINING TITANIUM DIOXIDE DOPED WITH FLUORINE

RELATED APPLICATIONS

This is a divisional of application Ser. No. 13/814,353, filed Feb. 5, 2013, now U.S. Pat. No. 9,184,460, which is a 35 U.S.C. 371 national stage filing from International Application No. PCT/IB2011/053261, filed Jul. 21, 2011, which claims priority to Italian Application No. TV2010A000115, filed Aug. 6, 2010, the teachings of which are incorporated herein by reference.

SUMMARY

The invention comprises producing inorganic/organic hybrid membranes based on a material capable of conducting ions, and in particular protons, in which nanometric particles of $TiO_2$ doped with fluorine ($TiO_2F$) are dispersed as a filler. The resulting membranes are characterized by better proton conductivity and better mechanical properties than similar systems which do not include the fillers. Furthermore the proton conductivity and the performance of some of the resulting inorganic/organic hybrid membranes in PEMFC fuel cells are less compromised by dehydration than similar systems which do not include the fillers.

The invention relates to the use of a family of nanometric inorganic fillers based on $TiO_2$ doped with fluorine-based species in the preparation of inorganic/organic hybrid ion exchange membranes and in particular proton exchange membranes for use in fuel cells and PEM electrolysers.

STATE OF THE ART

A fuel cell is a device which converts the chemical energy of the reagents fed to it directly into electrical energy. Fuel cells are well known in the art and are for example described in Cappadonia et al., Ullmann's Encyclopedia of Industrial Chemistry, *Fuel Cells*, 2005, 1-23, Wiley-VCH, which is included here for reference.

Given that a fuel cell is an electrochemical device and not a heat engine, it can easily achieve very high efficiencies, even more than twice those characteristic of conventional combustion engines. There are many different families of fuel cells distinguished by the materials from which they are made and the temperature at which they operate in optimum mode. One of the most intensively studied families is the one including polymer electrolyte fuel cells (Proton Exchange Membrane Fuel Cells, PEMFC). PEMFC operate at low temperature (T<130° C.) and comprise a polymer membrane capable of conducting protons (Proton Exchange Membrane, PEM) separating two porous electrodes through which reagents and reaction products can diffuse (Gas Diffusion Layers, GDL). These are covered with a layer of electrocatalysing material used to promote the electrochemical reactions involved in the functioning of the device. PEMFC are silent devices with no moving parts, of simple construction, that are capable of achieving high efficiencies (even over 55%) and are characterised by high energy and power densities. Also, PEMFC do not produce fine powders or pollutants such as sulphur or nitrogen oxides ($SO_X$ and $NO_R$) and, if fed with pure hydrogen, the only product of their operation is water. All these characteristics make PEMFC particularly suitable devices for providing power for vehicles or portable electronic devices such as multimedia readers, portable computers and other devices, without causing any harm to the environment.

The core of every PEMFC is the proton conducting membrane, through which protons obtained at the anode following oxidation of the fuel can be transported to the cathode where they are recombined with the products of the reduction reaction of the oxidizing agent. The latter generally comprises oxygen present in the air. The most widely used materials in manufacturing proton exchange membranes are perfluorinated copolymers such as NAFION® (a sulfonated tetrafluoroethylene based fluoropolymer-copolymer), HYFLON® Ion (a perfluorosulfonic acid membrane), polymers made by DOW® company and others. All these materials comprise a main perfluorinated polymer chain, similar to that of TEFLON® (a synthetic fluoropolymer of tetrafluoroethylene), from which there extend perfluoroether side chains terminating in an —$SO_3H$ group characterized by high acidity. These materials are capable of conducting protons in that, as soon as water is present, there is a marked phase separation into domains of different polarity. The domains having the highest polarity include water, which is made strongly acid by the —$SO_3H$ groups delimiting the domains. These high polarity domains are immersed in a low polarity matrix comprising the main perfluorinated chains and the perfluoroether side chains. Proton conduction occurs when different polar domains come into contact following fluctuations in the low polarity matrix. When this happens, there is long range migration of protons from one high polarity domain to another in the form of $H_3O^+$ ions. The perfluorinated copolymers described above characteristically have high proton conductivity and excellent chemical stability. On the other hand they are extremely expensive and only perform their function if they are suitably hydrated. Finally, perfluorinated copolymers do not always succeed in preventing the reagents from permeating from one electrode to the other. The microscopic dynamics of the low and high polarity domains present in the perfluorinated copolymers are intimately associated. One consequence of this fact is that the maximum temperature at which a perfluorinated copolymer can operate efficiently is approximately 80-90° C.; above this there are transitions which change the microscopic structure of the material, causing it to dehydrate easily with a consequent fall in proton conductivity. One of the most important aims of research in the field of proton exchange membranes for use in PEMFC includes the use of non-humidified gaseous reagents at an operating temperature of at least 120-130° C. Under these conditions it is possible to design smaller and more compact PEMFC systems that are also capable of using, as a fuel, "dirty" hydrogen obtained from the processes of the steam reforming of hydrocarbons. Other families of proton conduction materials have also been conceived, these including sulphonated polyethersulphone, sulphonated polyetherketone, sulphonated silicones and others. Although in many respects better than perfluorinated copolymers, none of these materials are at present able to fully express their potential, and still require appreciable research efforts.

One of the strategies for obtaining proton conduction membranes having better performance characteristics than that provided by the systems now available is that of developing inorganic/organic hybrid membranes. These membranes comprise a material capable of conducting protons, such as for example NAFION®, in which nanometric inorganic powders, such as oxides and phosphonates acting as fillers which may have been given surface functionality, are dispersed. The resulting inorganic/organic hybrid materials may be characterized by better mechanical properties than the proton-conducting starting materials; the proton conductivity may be better and be less influenced by the level of hydration under which they operate.

Proton-conducting inorganic/organic hybrid membranes are well known in the art and are described for example in the following articles: Di Noto et al., *Journal of Power Sources,* 178 (2008) 561-574; Di Noto et al., *Journal of Power Sources,* 187 (2009) 57-66; Chen et al., *Journal of Membrane Science,* 307 (2008) 10-20; all of which are incorporated for reference.

Fuel cells containing ion-exchange membranes are also described in U.S. Pat. Nos. 7,713,899, 7,661,542 and US2008/0248356, all of which are included here for reference. Another family of devices of great technological interest based on functional elements quite similar to those described above for applications in PEMFC is that of PEM electrolysers (Proton Exchange Membrane electrolysers). A PEM electrolyser is essentially a PEM fuel cell which acts in reverse by converting the electrical power and the water fed to it into hydrogen and oxygen having a high degree of purity (in excess of 99.9%) through an electrolysis process. PEM electrolysers are used to produce pure gases only when they are needed for a particular application, thus avoiding the need to store them in heavy bulky cylinders subject to strict safety standards for high-pressure highly flammable gases. The core of a PEM electrolyser comprises the same proton exchange membrane as is used in a PEMFC; the material used to make the membrane must have optimum proton conductivity and high chemical and electrochemical stability.

PEM electrolysers are well known in the art and are for example described in Spiegel, *Designing & Building Fuel Cells,* 2007, 346-348, McGraw-Hill and in Grot, *Fluorinated Ionomers,* 2008, 113-116, William Andrew Inc., all of which are included here for reference. WO2005/090235 and WO2006/077203 describe the production of undoped titanium dioxide. Fluorine-doped titanium dioxide is described in: Li et al., *Journal of Fluorine Chemistry,* Elsevier, vol. 126, n. 1, 69-77, 2005; Todorova et al. *Material Science and Engineering,* Elsevier, vol. 152, n. 1-3, 50-54, 2008; Czoska et al. *Journal of Physical Chemistry,* vol. 112, 8951-8956, 2008; U.S. Pat. No. 5,597,515; WO 2009/113045.

DESCRIPTION OF THE INVENTION

It has now surprisingly been found that an inorganic/organic hybrid membrane containing fluorine-doped $TiO_2$ has better ion conductivity and mechanical properties than the inorganic/organic hybrid membranes known in the art.

The membranes to which this invention relates will conduct protons but can also conduct other ions that are not protons (for example $NR_4^+$ where R is a $C_1$-$C_6$ alkyl radical such as methyl or ethyl).

Furthermore the proton conductivity and performance of inorganic/organic hybrid membranes containing fluorine-doped TiO2 in PEMFC fuel cells is less compromised by dehydration than similar systems which do not contain fluorine-doped TiO2.

Finally, use of the abovementioned membranes in the production of PEM electrolysers provides these electrolysers with a longer service life.

The present invention therefore relates to the use of fluorine-doped $TiO_2$ in the preparation of proton-exchange inorganic/organic hybrid membranes, proton—exchange inorganic/organic hybrid membranes thus obtained and the fuel cells and PEM electrolysers containing them.

For the purposes of the present invention the term fluorine-doped $TiO_2$ preferably means particles of said crystalline metal oxide having an average particle size of less than 500 nm, preferably between 10 and 500 nm, containing fluorine, hydroxy groups, ammonium cations and nitrogen oxides. In particular the terms fluorine-doped $TiO_2$ particles, fluorine-doped titanium dioxide particles or FT mean particles of anatase having an average particle size of less than 500 nm, preferably between 10 and 500 nm, even more preferably between 50 and 300 nm, which have fluorine, hydroxy groups, ammonium cations and nitrogen oxides on their surface. More particularly said particles are of the "shell-core" type, that is they are formed of an internal core essentially comprising crystalline titanium dioxide, preferably anatase, and a surface coating having a mean thickness of between 0.3 and 20 nm, preferably between 0.6 and 10 nm. The surface coating contains fluorine atoms bridging with titanium atoms and terminal fluorine atoms; it is also rich in hydroxy groups, ammonium cations and nitrogen oxides located on the surface of the coating.

According to one of the aspects of the invention the process for the production of fluorine-doped $TiO_2$ comprises the following stages:

(a) a titanium ore, preferably containing iron, is reacted with a $NH_4HF_2$ aqueous solution;

(b) the aqueous dispersion thus obtained is filtered with consequent separation of a solid residue and an aqueous solution containing titanium salts;

(c) the aqueous solution thus obtained is subjected to hydrolysis, said hydrolysis comprising a first stage at pH 6.5-8.0 and a second stage at pH 9.0-11.0;

(d) the aqueous dispersion thus obtained is filtered and the solid residue is subjected to pyrohydrolysis at a maximum temperature of approximately 500° C., preferably approximately 450° C.;

(e) optionally the filtrate obtained from stage (d) is heated to a temperature of 150-170° C., preferably approximately 160° C., and kept at this temperature for a period of 0.5 to 2 hours, with the consequent production of $NH_4HF_2$, which once re-dissolved in water can be recycled to stage (a).

This process includes the extraction of titanium from the ilmenite ore ($FeTiO_3$), which may possibly be enriched; this extraction takes place within a suitable reactor, causing the ore to react with a concentrated aqueous solution of between 10% and 37% by weight and preferably approximately 30% by weight of $NH_4HF_2$ having a pH preferably between 5.5 and 5.7. Chemical analysis of the ilmenite performed using ICP-AES before the start of the reaction with $NH_4HF_2$ has shown that ore contains traces (<1% by weight) of Al, Ca, Co, Ni and Zn. 1.1% by weight of W is also present.

The ore is added to the reactor preferably with an average particle size of 0.05-1.5 mm, even more preferably approximately 0.2 mm, and may be preheated to 80-120° C., preferably to approximately 100° C. It suggested that the ore should be added to the base of the reactor by means of a system which prevents the gases present within the reactor from rising up the inlet pipe for said sand. The aqueous solution of $NH_4HF_2$ is preferably preheated to 50-100° C., preferably approximately 80° C.; the ratio by weight between the ilmenite and the $NH_4HF_2$ solution (preferably 30% by weight) is normally between 1:6 and 1:8, and is preferably approximately 1:7.5.

The reactor has equipment to stir the ilmenite sand in such a way as to encourage intimate contact between the reagents (ilmenite and solution), in particular at the bottom of the reactor. The stirring is possibly such as not to create turbulent motion in the top of the reactor; in the best embodiment the stirring speed should not exceed 20 rpm, preferably 10 rpm.

The temperature within the reactor is kept at 100-110° C., preferably 104-106° C., and even more preferably approximately 105° C., at a pressure of between approximately 1 and 2 bar (g); this may be achieved using the conventional means known in the art, for example a heating jacket system on the outside of the reactor; in the best embodiment the greatest quantity of heat is transmitted through the bottom of the reactor, where the concentration of reagents is highest; also, in order to prevent the escape of gaseous compounds into the outside environment, it is recommended that a leaktight reactor should be used. The reaction has a preferred duration of 40 to 80 minutes.

The pH within the reactor under these operating conditions is approximately 6.5-7.0. Gaseous ammonia is produced by the reaction; this can be conveyed outside the reactor and absorbed in water to obtain a concentrated solution (approximately 24% by weight) of ammonium hydroxide $NH_4OH$, which can in turn be used during the subsequent stages of hydrolysis of the titanium salts. Removal of the ammonia also makes it possible to control the pressure within the reactor (normally approximately 1 bar (g)).

The reaction between $FeTiO_3$ and $NH_4HF_2$ (in aqueous solution) produces two salts: ammonium hexafluorotitanate $(NH_4)_2TiF_6$ and ammonium (ferric) hexachloroferrate $(NH_4)_3FeF_6$. The titanium salt has a solubility which depends directly on temperature and is inversely dependent on the concentration of $NH_4HF_2$; it therefore remains in solution under the reaction conditions. The iron salt instead has negligible solubility and remains in the form of a solid dispersion.

An aqueous solution of $NH_4HF_2$ and $(NH_4)_2TiF_6$ containing the dispersed $(NH_4)_3FeF_6$ salt is recovered from the reactor. The dispersion leaving the reactor is caused to pass through a filter capable of retaining solid particles having dimensions between 0.1 and 2.0 μm; this result can be achieved using meshes having holes of 2-3 nm, approximately 2.5 nm. In this section the solid dispersion of the iron salt is separated from the solution of titanium salt.

The filtered sludge may be further washed with $NH_4F$ and/or $NH_4HF_2$ solutions and then filtered a second time; these two filtrations may take place within the same filtering equipment.

After filtering the following is obtained:
(a) a solid sludge portion containing the iron salt $(NH_4)_3FeF_6$;
(b) an aqueous solution containing the titanium salt $(NH_4)_2TiF_6$, ammonium difluoride $(NH_4HF_2)$ and traces of the iron salt $(NH_4)_3FeF_6$, which is a contaminant for the final product.

The solid sludge portion (a) normally has a moisture content of between 10 and 20% by weight depending upon the filtering equipment used. The aqueous solution (b) normally has an iron salt $(NH_4)_3FeF_6$ content of approximately 0.04-0.06% by weight.

The aqueous solution (b) from the filtration stage is then further purified from the iron salt $(NH_4)_3FeF_6$ in order to reduce its concentration to less than 0.01% by weight, preferably less than 0.001% (understood as the concentration of the iron salt), which is equivalent to approximately 2.5 mg/L (2.5 ppm) of Fe ions in solution.

This is brought about by displacing the pH of the solution to 6.5-8.0, preferably to 7.0-8.0 and even more preferably to 7.0-7.5 by adding concentrated ammonium hydroxide $(NH_4OH)$ solution (approximately 24% by weight); this operation causes the formation of an insoluble ammonium oxyfluorotitanate $[(NH_4)_3TiOF_5)]$ which precipitates incorporating the residual iron salt $(NH_4)_3FeF_6$.

The operation is performed within a reactor at a temperature of 50-70° C., preferably approximately 60° C., with stirring; the stirring speed is normally 40-90 rpm, preferably approximately 50 rpm; the quantity of $NH_4OH$ which has to be added is controlled by keeping the pH in the outflow from the vessel to a preferred value of 7.0-8.0, and even more preferably 7.5-8.0.

The dispersion is filtered, yielding an aqueous solution of the titanium salt $(NH_4)_2TiF_6$, further purified from compounds containing iron, and a sludge containing the titanium complex and the iron salt $(NH_4)_3FeF_6$.

The sludge may be dissolved again within a further vessel provided with stirring for acidification; this takes place with the addition of a concentrated $NH_4F$ and/or optionally $NH_4HF_2$ solution (approximately 40-50% by weight) to a pH of approximately 6.5-7.0; in this way the titanium salt becomes soluble again, forming $(NH_4)_2TiF_6$. The solution/dispersion thus obtained is then recycled in addition to the outflow from the main reactor.

This solution/dispersion contains both the soluble titanium salt $(NH_4)_2TiF_6$ and the insoluble iron salt $(NH_4)_3FeF_6$ which has been incorporated by the ammonium oxyfluorotitanate as it precipitates out. This makes it possible to recover both metals completely without producing any waste.

The purified solution, which contains the titanium salt $(NH_4)_2TiF_6$, $NH_4F$ and water, is then subjected to further hydrolysis.

The further hydrolysis is performed in a reactor fitted with a stirrer (approximately 10 rpm), maintaining a temperature of 50-70° C., preferably approximately 60° C. The reaction takes place by raising the pH of the solution to very high values, preferably 9-11 and even more preferably approximately 10-11 (monitoring the outflow from the reactor); this result is obtained by adding a concentrated solution of ammonium hydroxide $NH_4OH$ (approximately 24% by weight); this ammonium hydroxide solution is preferably used in large excess in compared to that which is required for the reaction.

The further hydrolysis brings about the precipitation of a mixture of hydrated titanium salts and oxides $(NH_4)_2TiOF_4+(NH_4)_3TiOF_5+TiO_2.n\ H_2O$ in the form of particles having dimensions of approximately 0.01 μm. As a consequence an aqueous solution of $NH_4F$ with a dispersed solid comprising salts which can be filtered out is produced in the hydrolysis reactor.

The dispersion so obtained is then filtered through a filter having extremely fine meshes (2-3 nm, preferably approximately 2.5 nm).

The solution leaving the filter, which contains $NH_4F$, water, excess ammonia and traces of titanium salts, is preferably treated to obtain solid $NH_4HF_2$ so that it can be reused in the stage of reacting with the ilmenite. In order to perform this operation, the solution is preferably heated to boiling in the presence of very slight negative pressure (10 to 60 mm of Hg) with the release of ammonia; the temperature is then raised to 150-170° C. and kept there for at least 60 minutes (still under negative pressure), preferably for 60-120 minutes, with consequent decomposition of the $NH_4F$ salt into $NH_4HF_2$ and ammonia, with the latter being removed. After this operation a solid salt is present in the bottom of the reactor and this is dissolved in water to yield a solution of 10% to 37% by weight, preferably approximately 30% by weight, having a pH of 5.5-5.7.

The sludge part leaving the filter, which normally has a moisture content of between 10 and 20% by weight depending upon the filtering equipment, is subjected to a pyrohydrolysis process. In more detail, after drying to the point where water is removed, the sludge containing the titanium salts undergoes pyrohydrolysis at a maximum temperature of 500° C., preferably at a maximum temperature between 330 and 470° C. and even more preferably between 350 and 450° C., being kept at the maximum temperature for a period of 1-3 hours, preferably approximately 2 hours; this normally takes place in a furnace in an atmosphere of superheated steam; the maximum temperature is reached gradually, preferably with a gradient of 3-6° C./minute, even more preferably 5° C./minute.

The gaseous compounds extracted from the furnace containing $NH_3$, HF, $H_2O$ are normally cooled and absorbed in water to obtain a concentrated solution of $NH_4F$ and/or $NH_4HF_2$ which can easily be recycled and reused to charge the reactor. It is recommended that the gases should not be cooled below 200° C. before being absorbed in water, to prevent the formation of $NH_4F$ and/or $NH_4HF_2$ crystals with consequent obstruction of the tubing.

Under these conditions, if the metal is titanium, all the ammoniacal fluorine bonds are broken, yielding a powder product comprising just fluorine-doped $TiO_2$ particles, the characteristics of which are shown below:

Analysis by HR-TEM (High-Resolution Transmission Electron Microscopy) reveals the sub-micron morphology of the FT powders. In particular the particles are found to have a polydisperse size distribution, being present either as regular shapes with well-defined edges or as smaller-size irregular shapes. Measurement of the interplanar distances for both types of particles shows that nanocrystals of anatase having dimensions of less than 500 nm are present (see FIGS. 1 and 2).

Scanning electron microscope (SEM) analyses made using an acceleration voltage of 10 kV and a standard secondary electrons detector have revealed that some of the particles have aggregated to form globular masses while some have aggregated to form internally hollow octahedral structures having edges of variable length between 40 to 60 μm, preferably approximately 50 μm (see FIGS. 3 and 4).

Elementary analysis using SEM with energy dispersion microanalysis (SEM-EDS) has revealed a quantity by weight of fluorine (with respect to the total mass of the particles) of between 0.5 and 5% by weight, preferably between 1.0 and 4% by weight.

XPS (X-ray Photoelectron Spectroscopy) surface elementary analysis has revealed a quantity of fluoride of between 9% and 30% molar with respect to the titanium, which is approximately equivalent to a weight fraction of fluorine of between 1.5 and 9% by weight, preferably between 2.1 and 6.8% by weight. The latter values are slightly greater than those obtained using the scanning electron microscope (SEM), an indication that the crystalline structures which are richer in fluorine and other elements (nitrogen and hydroxy groups) are to be found on the surface.

Elementary analysis has revealed a quantity of nitrogen of between 0.2 and 8% by weight, preferably between 0.3 and 7.5%, even more preferably between 2.5 and 7%, and a quantity of hydrogen between 0.05 and 4% by weight, preferably between 0.08 and 3%, even more preferably between 1.5 and 2.5% (the percentages are to be understood as being relative to the total mass of the particles); the presence of hydrogen has been associated with the surface hydroxy groups, while the nitrogen has been associated with ammonium groups, $NH_4$, and nitrogen oxides, $NO_x$, above all on the surface.

Chemical analysis of the particles performed using ICP-AES has shown that they contain traces (<1% by weight) of Ca, Co, Fe, K, Mg, Nb, Ni, W, Si and Zn;

X diffraction (XRD) investigations have confirmed that the FT particles are made of a single crystalline phase—anatase, without amorphous traces or traces of the initial transition to rutile. No structural modification due the presence of the fluoride was noted from the XRD spectrum of the FT powders and it can therefore be assumed that this is only present on the surface of the FT particles.

From all the investigations it follows that the particles are nanocrystals of titanium dioxide containing fluorine, preferably anatase, said nanocrystals being characterized in that the fluorine is mainly present on their surfaces and that its concentration decreases gradually moving away from the surface, that is towards the centre of the crystal.

One aspect of the invention is therefore represented by the fact that the fluorine (or the fluorine atoms) is essentially present on the surface of the particles; in other words at least 80% of the fluorine, preferably at least 90%, is present in the surface layer of the particles, this surface layer having a mean thickness of between 0.3 and 20 nm, preferably between 0.6 and 10 nm.

The investigations performed also demonstrate that the fluorine atoms both form bridges between titanium atoms and are terminal.

Hydroxy groups as well as ammonium cations and nitrogen oxides are also present on the surfaces of the particles.

The "shell-core" structure of the particles, that is the surface location of the fluorine and the hydroxy groups, has a significant part to play for the purpose of using these in the production of inorganic/organic hybrid membranes.

The inorganic/organic hybrid membrane is prepared from a uniform dispersion in a suitable solvent which includes the proton-conducting material and the filler in the quantities established through a conventional solvent-casting process described for example in Liao et al., "Fabrication of porous biodegradable polymer scaffolds using a solvent merging/particulate leaching method", *Journal of Biomedical Materials Research* 59 (4):676-81, March 2002, included here for reference. The hybrid membrane is obtained after the solvent has been removed and the resulting system has been suitably modeled. At this point the membrane may undergo a number of thermal, mechanical and chemical treatments to consolidate it and improve its mechanical and functional properties. The membrane is finally washed and suitably activated to remove any traces of solvent and other undesirable anionic and cationic contaminants and if possible improve its mechanical and functional properties further, thus giving rise to the final inorganic/organic hybrid membrane.

The solvent casting process mentioned may be performed from liquid suspensions or homogeneous liquid solutions at temperatures varying between 0 and 170° C., said suspensions and liquid solutions being preferably obtained by mechanical mixing and by the treatment of precursors and solvents with ultrasound; preferably ionomer polymers based on polytetrafluoroethylene sulphonates, polysulphone sulphonates, polyetherketone sulphonates, acidified polybenzimidazoles, polyalkyl siloxanes rendered functional with acid groups and aprotic polar organic solvents such as DMF are preferably used.

Alternatively the membranes according to this invention may be obtained by other conventional processes, for example by extruding mixtures of precursors at temperatures over 150° C.

The following examples are for the purpose of illustration and do not restrict the invention.

EXAMPLES

Example (a)

Preparation of Fluorine-Doped $TiO_2$ 7 litres of water, 3 kg of $NH_4HF_2$ salt and 1341 g of ilmenite sand sieved to a particle size of less than 200 microns were placed in a stirred reactor having a volume of approximately 10 litres. The mixture was then brought to boiling at atmospheric pressure, and kept there for approximately 1 hour. After this stage of reaction with the ore, 4 litres of solution were drawn off through the valve in the bottom of the reactor and then filtered. 1.5 litres of a concentrated 30% solution of ammonia was added to the solution thus filtered containing the titanium and iron fluorides, thermostatted to 70° C., increasing its pH to 7.3. The white precipitate was separated out by filtration and a further 2 litres of a concentrated solution of 30% ammonia were added to the filtrate to obtain a pH of around 9.5. The white precipitate was separated out by filtration and subjected to the subsequent stage of pyrohydrolysis. Approximately 30 g of this wet intermediate (moisture content approximately 20%) was placed in an aluminium tube. The tube was inserted into a furnace chamber. It was then heated as follows: 4.7° C./min up to 450° C. and kept there for 2 hours. Slow cooling followed. Approximately 20 g/min of steam were fed to the tube during the entire test until it ceased to remain at high temperature. The final powder was yellow in appearance and not agglomerated. This comprised anatase doped with approximately 2.3% by weight of fluorine.

Example 1

A quantity of 5% by weight NAFION® emulsion was dried by evaporating the solvents. The quantities of solid obtained were dissolved in approximately 15 ml of dimethylformamide in the ratio shown in Table 1; the product was a mixture which was rendered homogeneous following treatment in a conventional ultrasound bath for a period of 2 hours. The filler, comprising submicron particles of fluorine-doped $TiO_2$ obtained according to example (a), was added to the NAFION® mixture, yielding the filler/NAFION® ratio by weight shown in Table 1. The resulting suspension was carefully homogenized by treatment in an ultrasound bath for 5 hours and was then subject to a conventional solvent-casting process in dry air to remove the solvent completely. The membrane obtained was: a) hot pressed at a temperature below 150° C.; b) repeatedly washed with hydrogen peroxide to remove any traces of organic solvent; c) repeatedly activated with a solution of sulphuric acid to remove cationic contaminants and activate the sulphone groups of the NAFION®. The final inorganic/organic hybrid membrane was obtained by drying the product obtained in air.

TABLE 1

Quantity of NAFION ® and filler used when preparing the membranes

| Membrane | Nominal % weight of filler | Mass of Nafion (mg) | Mass of filler (mg) | Effective % weight of filler |
|---|---|---|---|---|
| Nafion | 0 | 1040.4 | 0 | 0 |
| $TiO_2F$ 5% | 5 | 982.6 | 43.9 | 4.28 |
| $TiO_2F$ 10% | 10 | 936.4 | 89.7 | 8.74 |
| $TiO_2F$ 15% | 15 | 884.3 | 135.4 | 13.3 |

Example 2

The inorganic/organic hybrid membrane is prepared as described in Example 1, but starting from an emulsion of other perfluorinated copolymers such as HYFLON® Ion, polymers made by DOW® company, ACIPLEX® (a perfluorosulfonic acid membrane), FLEMION® (a fluoropolymer ion-exchange membrane), polymers made by 3M® company and others.

Example 3

The inorganic/organic hybrid membrane is prepared starting from the perfluorinated copolymer precursor functionalised with —$SO_2F$ groups mentioned in Examples 1 and 2. The homogeneous mixture containing the desired quantities of precursor and filler comprising nanometric fluorine-doped $TiO_2$ particles is prepared. The mixture is then extruded, yielding the precursor for the inorganic/organic hybrid membrane. This product is subjected to a successive number of chemical treatments to obtain the final acid form of the fluorinated copolymers. The subsequent steps in preparation of the inorganic/organic hybrid membrane are conducted as shown in Example 1.

Example 4

The inorganic/organic hybrid membrane is obtained as described in Example 1, but starting from a suspension or solution in suitable solvents (such as dimethylformamide, dimethylacetamide, dimethylsulphoxide or their mixtures and others) containing other polymers capable of exchanging protons such as polyetherketone sulphonates, sulphonated polysulphones, sulphonated silicones, etc.

Example 5

The inorganic/organic hybrid membrane is obtained as in Examples 1 and 4, but starting from a suspension or solution of polymer precursors capable of exchanging protons. Polymerization is carried out "in situ" before or after the filler comprising nanometric fluorine-doped $TiO_2$ particles is added. Polymerization can be carried out in one or more stages using one of the known techniques, which include for example the addition of suitable initiators, heat treatments, exposure to radiation or the like.

Example 6

The inorganic/organic hybrid membrane is obtained as described in Examples 1, 4 and 5, with the difference that the suspension contains more than one polymer capable of exchanging protons or its precursors.

Example 7

The inorganic/organic hybrid membrane is obtained as described in Examples 1 and 4-6, with the difference that the suspension is sprayed onto a hot substrate to remove the solvent.

Example 8

The inorganic/organic hybrid membrane is obtained as described in Example 7, with the difference that the suspension is formulated and homogenized immediately after being sprayed onto the substrate through a suitable system of two or more tanks, each of which has different contents. In this way it is possible to control the ratio of filler/-NAFION® by weight from one moment to another, obtaining a membrane having the desired concentration profile of nanometric fluorine-doped $TiO_2$ particles.

Example 9

The inorganic/organic hybrid membrane is obtained as described in Examples 1 and 4-6, with the difference that the homogeneous system containing the polymers capable of exchanging protons and the filler comprising fluorine-doped nanometric $TiO_2$ particles is extruded.

Example 10

The inorganic/organic hybrid membrane obtained as described in Examples 1-9 undergoes a chemical treatment with a view to consolidation thereof, comprising the addition of cross-linking agents such as $SiCl_4$, $TiCl_4$, $Ti(OR)_4$, $Si(OR)_3$ and the like.

Example 11

The inorganic/organic hybrid membrane obtained as described in Examples 1-9 is immersed in a solution containing organic cationic species (such as for example $NH_4^+$) or inorganic cationic species (such as $Li^+$, $Na^+$, $K^+$, $Ca^{2+}$) at a temperature below 150° C. The product is hot pressed at a temperature of 300° C. or less.

Example 12

The inorganic/organic hybrid membrane obtained as described in Examples 1-11 undergoes thermomechanical treatment with a view to consolidation thereof, comprising for example suitable hot pressing.

Example 13

The inorganic/organic hybrid membrane obtained as described in Examples 1-12 is subjected to one or more chemical treatments with a view to removing any residues of extraneous organic species, such as traces of the solvents used in preparation. For example the treatment may comprise washing the membrane in water, hydrogen peroxide, or other suitable oxidizing or reducing agents.

Example 14

The inorganic/organic hybrid membrane obtained as described in Examples 1-13 undergoes a chemical process designed to improve its proton exchange capacity, for example suitable treatment in a solution containing one or more acids.

Example 15

The inorganic/organic hybrid membrane obtained as described in Examples 1-14 undergoes treatment in an autoclave to cancel out its thermal history and improve its mechanical and functional properties.

Example 16

The inorganic/organic hybrid membrane obtained as described in Examples 1-15 is immersed in a suitable liquid capable of conducting protons, such as a PCIL (Proton-Conducting Ionic Liquid) for example TEA-TF (tetraethylammonium trifluoromethane sulphonate) and the like.

Example 17

The inorganic/organic hybrid membrane may be obtained by treating, with a suitable PCIL, a membrane comprising a material which may also be incapable of exchanging protons and which contains the desired quantity (as described in Example 1) of filler comprising nanometric particles functionalised with fluorine-based species. The membrane is prepared, treated and activated as described in Examples 1-16, without however the constraint of using polymers capable of exchanging protons, or their precursors.

COMPARATIVE EXAMPLE

This example provides a detailed description of the preparation and investigation of some inorganic/organic hybrid membranes according to the present invention. The mechanical properties of the membranes were studied through dynamic-mechanical analysis (DMA); in addition to this the membranes were used to form single fuel cells tested under operating conditions with different conditions for the pressure of the reagents, relative humidity and the oxidizing agent used.

Membrane Preparation

The filler used for preparation of the inorganic/organic hybrid membranes was synthesized as described above, and is indicated here by the formula $TiO_2F$. In all, four membranes were prepared using the procedure described in Example 1. Three of these were inorganic/organic hybrid membranes characterized by a different percentage by weight of $TiO_2F$; the fourth membrane did not contain any inorganic filler and was used as a reference. The quantities of reagents used in the preparation of the membranes are shown in Table 1.

The subsequent stages in membrane preparation were carried out as described in Example 1. All the resulting membranes had a similar thickness, of approximately 0.1 millimetre.

Dynamic-Mechanical Analyses

The membranes obtained were subjected to dynamic-mechanical analyses (DMA). FIG. 5 shows the change in the elastic modulus of the membranes as a function of temperature. It can be seen that all the inorganic/organic hybrid membranes are characterized by decidedly better mechanical properties than the pure NAFION® membrane used as a reference. In particular, as shown in insert a) in FIG. 5, at 25° C. the elastic modulus of all the inorganic/organic hybrid membranes is almost twice that of the pure NAFION® membrane. It can also be noted that while the 5% TiO$_2$F membrane and the pure NAFION® membrane undergo irreversible elongation at temperatures above approximately 120° C., the 10% TiO$_2$F and 15% TiO$_2$F membranes maintain their mechanical properties to quite high temperatures, to beyond 200° C. FIG. 6 shows the change in tan Δ=viscous modulus/elastic modulus of the membranes in relation to temperature. The maximum for peak a decreases substantially as the quantity of filler included in the inorganic/organic hybrid membrane increases, as shown in insert a). This experimental evidence is indicative of how the relaxation α, which is responsible for the decline in the mechanical properties of pure NAFION® at T>100° C., is strongly inhibited by the presence of the filler. As a consequence, the inorganic/organic hybrid membranes described in this example may also be used at higher temperatures than pure NAFION®, beyond 120-130° C., while continuing to maintain their mechanical properties.

Determination of the Performance Characteristics of the Membranes in an Individual PEMFC The membranes described in this example were used to manufacture membrane-electrode assemblies (MEA) which were then tested under operating conditions as individual PEMFC. The MEA were prepared using standard procedures. All the MEA used electrodes prepared from porous Teflon-coated carbon paper provided with microporous layers. Catalysts containing 20% by weight of platinum in the form of nanometric particles supported on activated carbon were used. The overall platinum load used for all the electrodes was 0.4 mg/cm$^2$. The active area of each electrode was approximately 4 cm$^2$. FIG. 7 shows the polarization curves for the MEA assembled from the membranes described in this example. It can be seen how all the MEA assembled from inorganic/organic hybrid membranes have better performance characteristics than the MEA assembled using the pure NAFION® membrane. The gradient of the polarization curve of a PEMFC fed with hydrogen at a cell voltage of approximately 0.6 V is inversely correlated to the proton conductivity of the membrane used. In general, the steeper the slope, the poorer the proton conductivity of the material from which the membrane is made. It can therefore be deduced that under "ideal" conditions (high reagent pressure, P=5 bar (g), use of oxygen as an oxidizing agent, 100% relative humidity and T=85° C.) all the inorganic/organic hybrid membranes have greater proton conductivity than pure NAFION®. This conclusion remains valid even if the MEA are subjected to a lower reagent pressure (P=2 bar (g), FIG. 8), and when the MEA are fed with air instead of pure oxygen as an oxidizing agent. The better performance of the inorganic/organic hybrid membranes than the pure NAFION® membrane is also evidenced by the higher maximum power density which can be obtained from the MEA, which is shown in FIG. 9 and FIG. 10 for reagent pressures of 5 and 2 bar (g), respectively. All the MEA were also tested under relative humidity conditions of 75%, 50%, 25%, 12.5% and 5%, maintaining a reagent pressure of 2 bar (g). FIG. 11 shows the corresponding polarisation curves for the MEA assembled from pure NAFION® membrane. FIG. 12, FIG. 13 and FIG. 14 show the similar polarisation curves for the MEA assembled from 5% TiO$_2$F, 10% TiO$_2$F and 15% TiO$_2$F membranes respectively. One way of evaluating the effect of relative humidity on the performance of MEA is that of using the maximum power density provided by the device under various conditions, as shown in FIG. 15, as a parameter. It can be seen how all the MEA have performances which worsen as the relative humidity of the reagents falls. However the MEA assembled using 10% TiO$_2$F membrane according to this invention is less influenced by dehydration than that assembled from pure NAFION® membrane, above all if fed with pure oxygen as the oxidizing agent.

Figure 1:
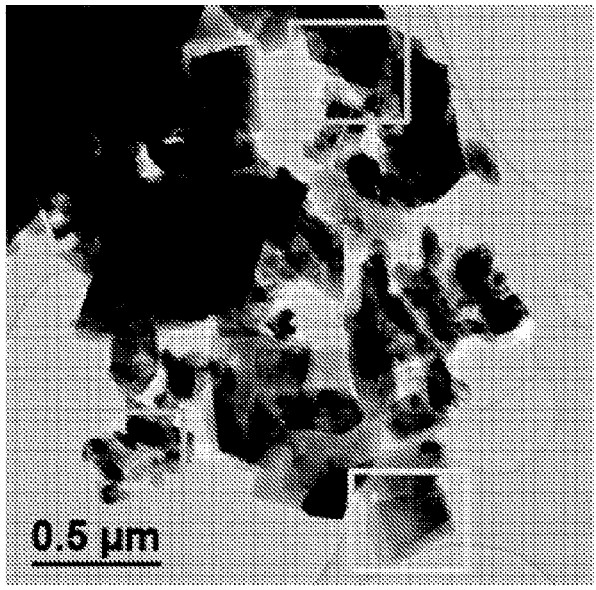
FIG. 1-2. HR-TEM (High-Resolution Transmission Electron Microscopy) analyses of fluorine-doped titanium dioxide particles.
Figure 2:
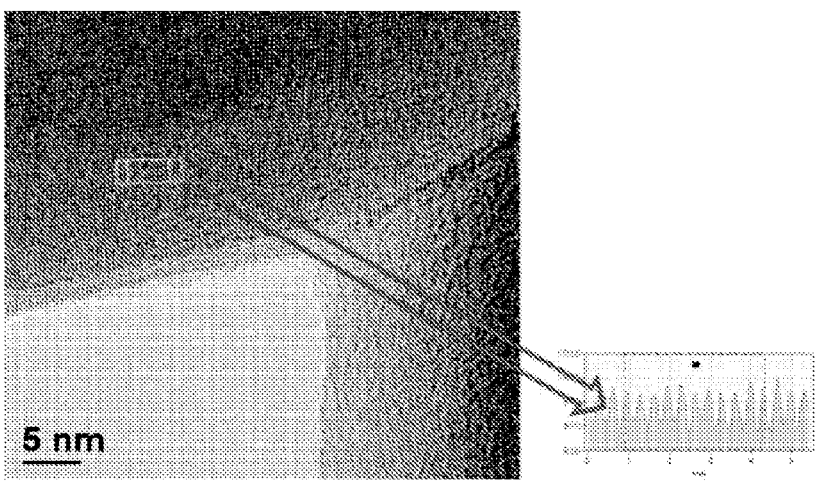
Figure 3:
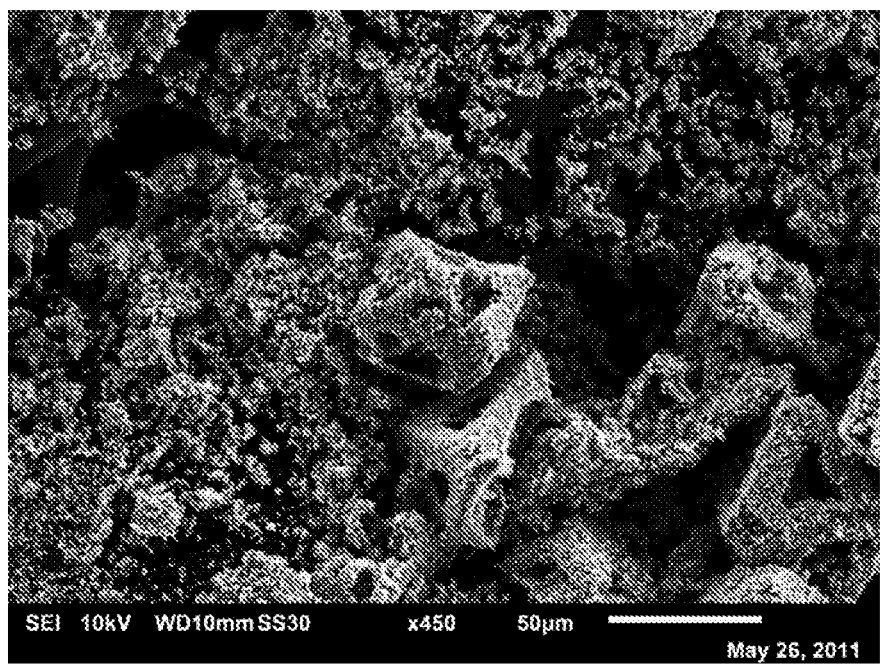
FIG. 3-4. Scanning electron microscope (SEM) analyses of fluorine-doped titanium dioxide particles.
Figure 4:
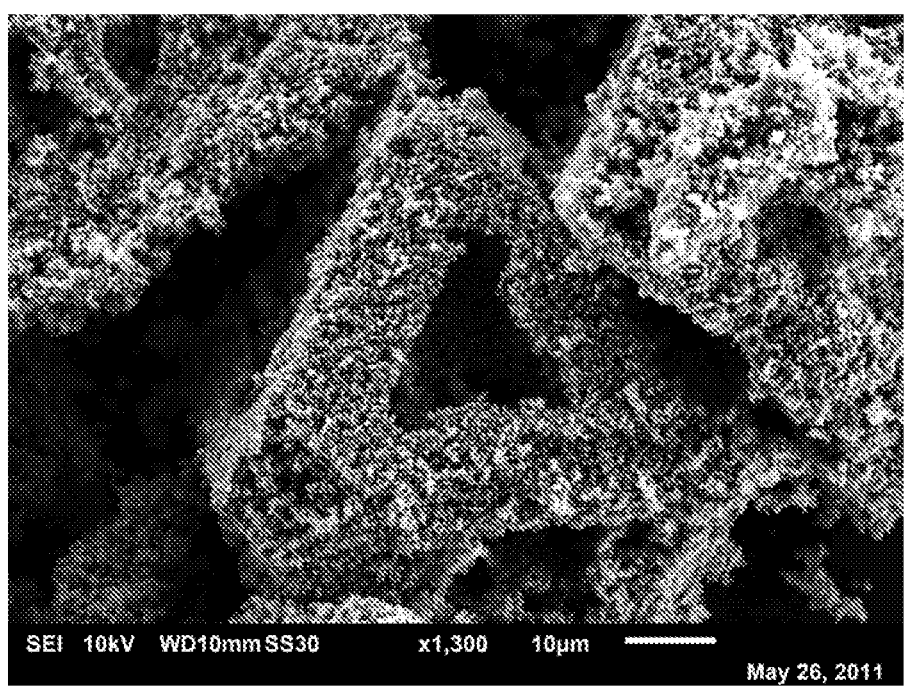
Figure 5:
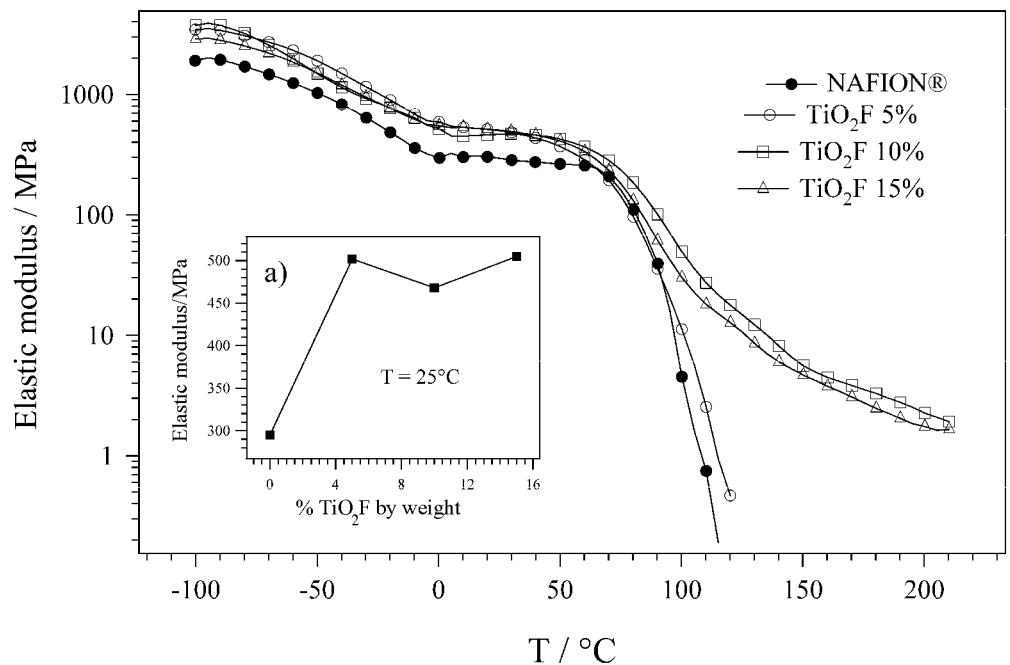
FIG. 5. Change in the elastic modulus of the membranes in relation to temperature. The values of the elastic modulus at 25° C. are shown in insert a).
Figure 6:
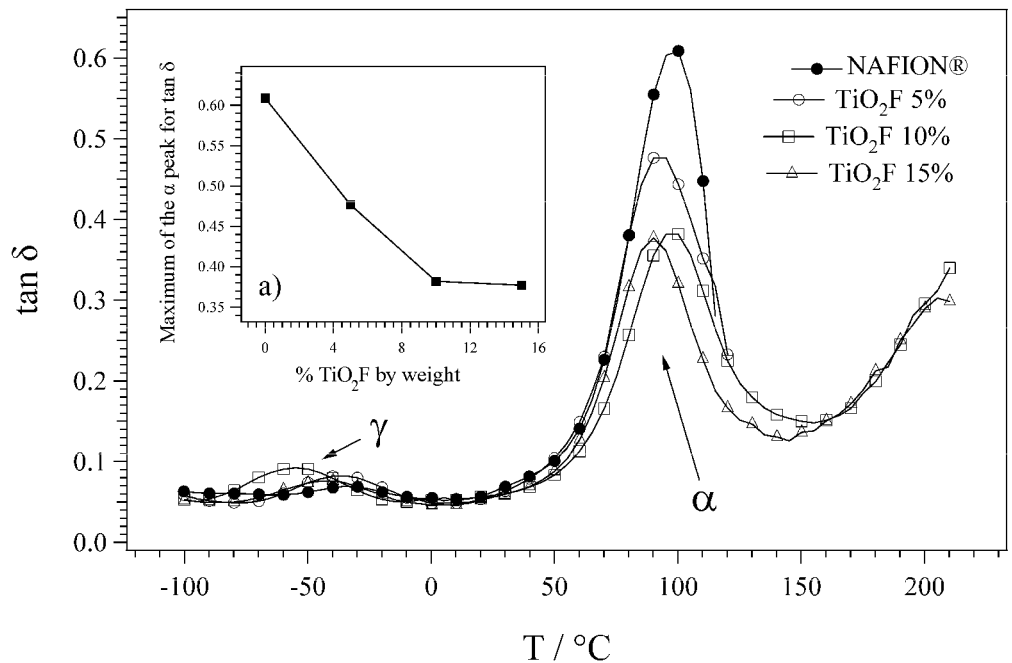
FIG. 6. Change in tan δ=viscous modulus/elastic modulus with temperature for the membranes. Insert a) shows the values of tan δ for the maximum peak α.
Figure 7:
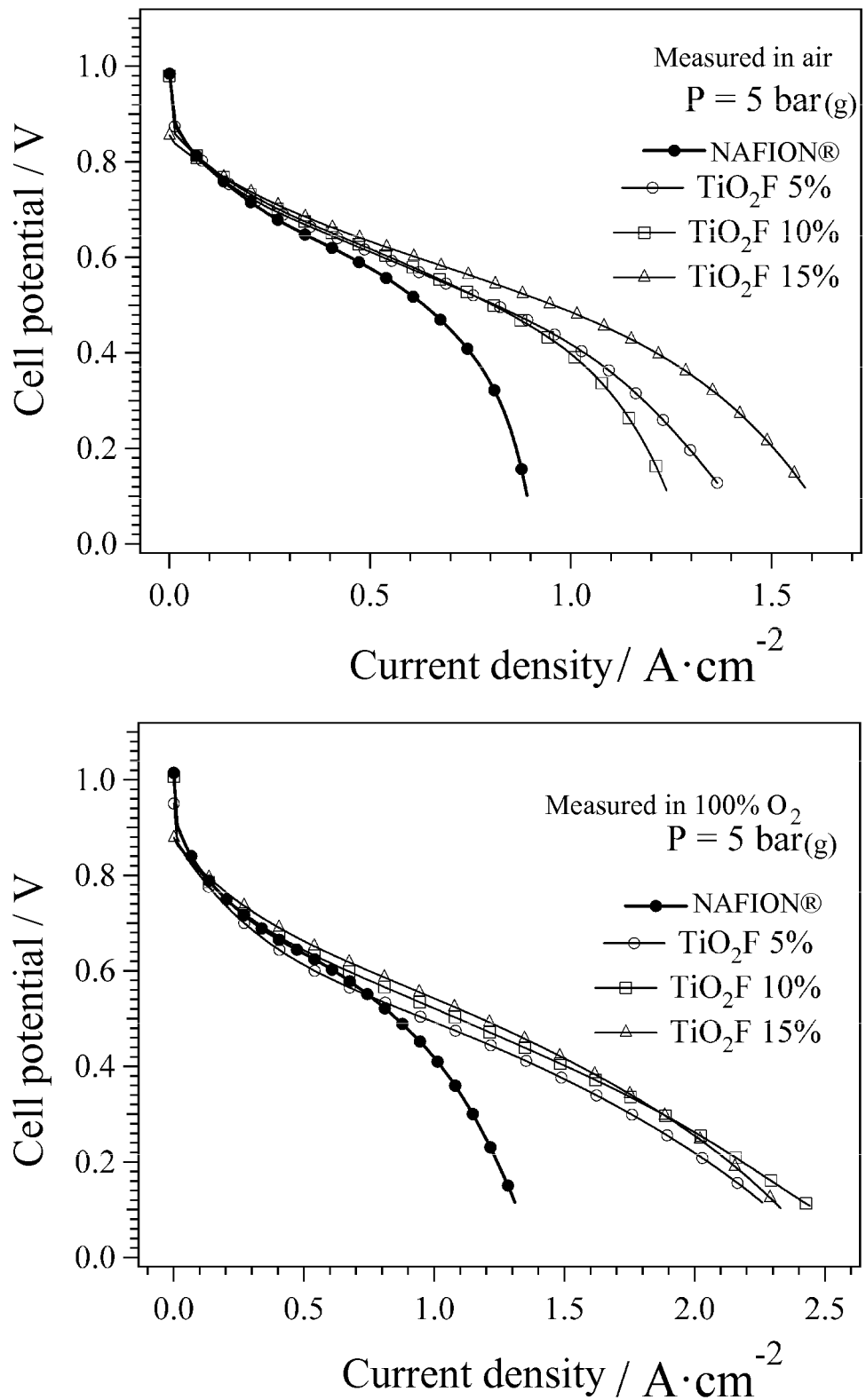
FIG. 7. Polarization curves for MEA assembled from the membranes. The operating conditions are as follows: cell temperature 85° C.; temperature of the hydrogen flow and oxidizing agent flow 85° C.; relative moisture content of the reagents 100%; flow of hydrogen: 800 sccm; oxidizing agent used: air (top), pure oxygen (bottom); flow of oxidizing agent: 1700 sccm (air), 500 sccm (pure oxygen); reagent pressure: 5 bar (g).
Figure 8:
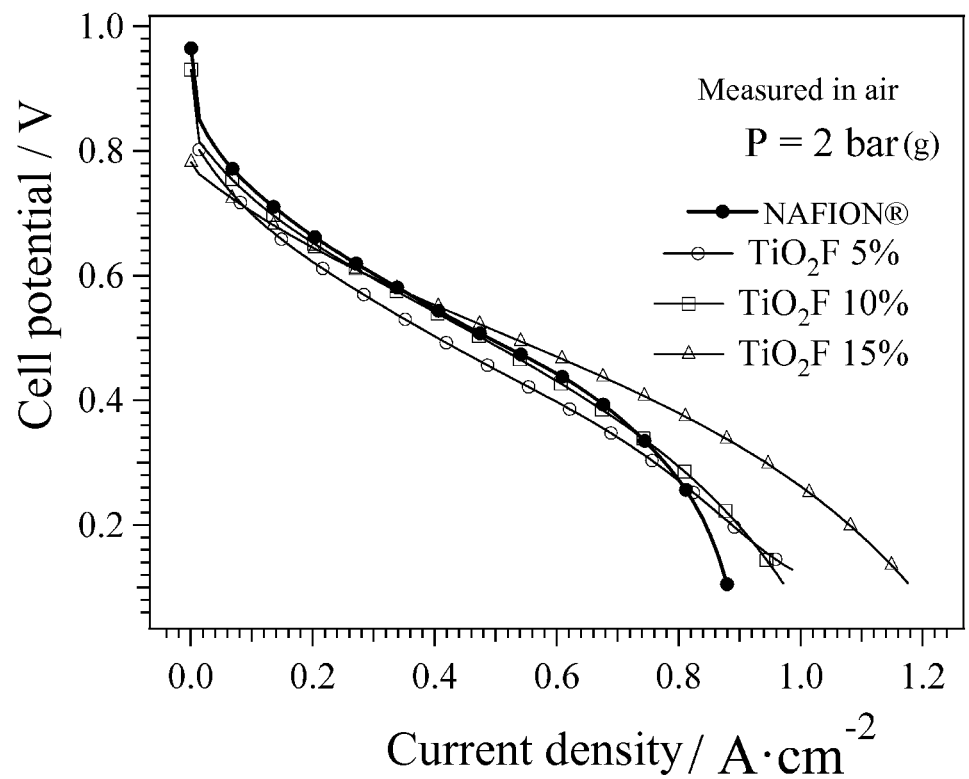
FIG. 8. Polarization curves for MEA assembled from the membranes. The reagent pressure is 2 bar (g); the other operating conditions are the same as those shown in the description for FIG. 7.
Figure 8:
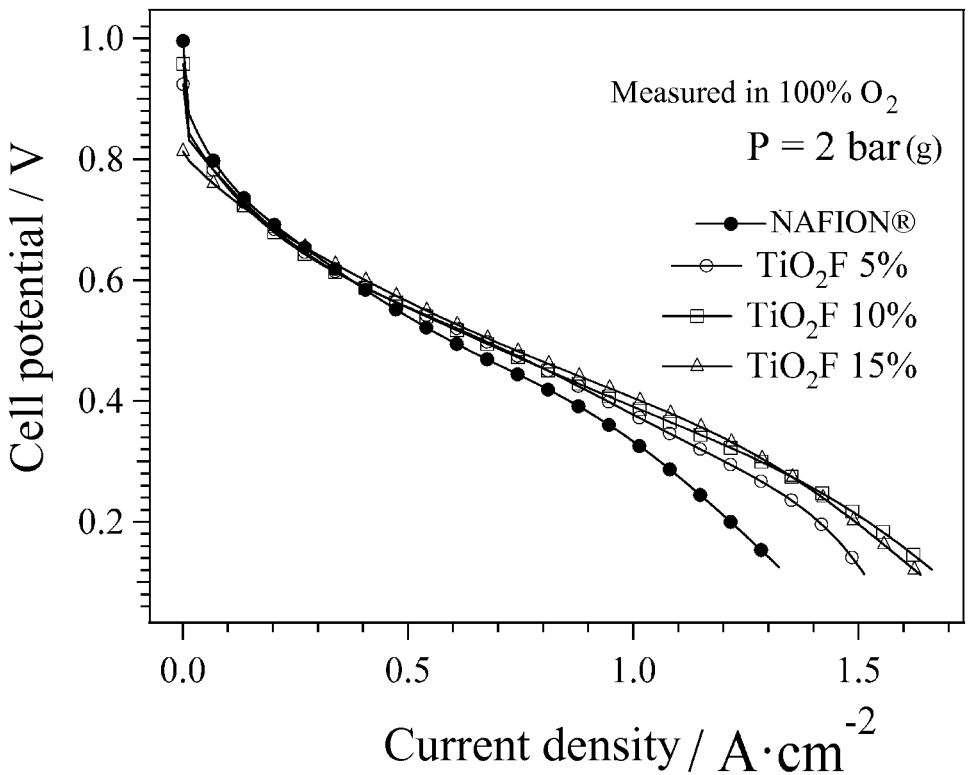
Figure 9:
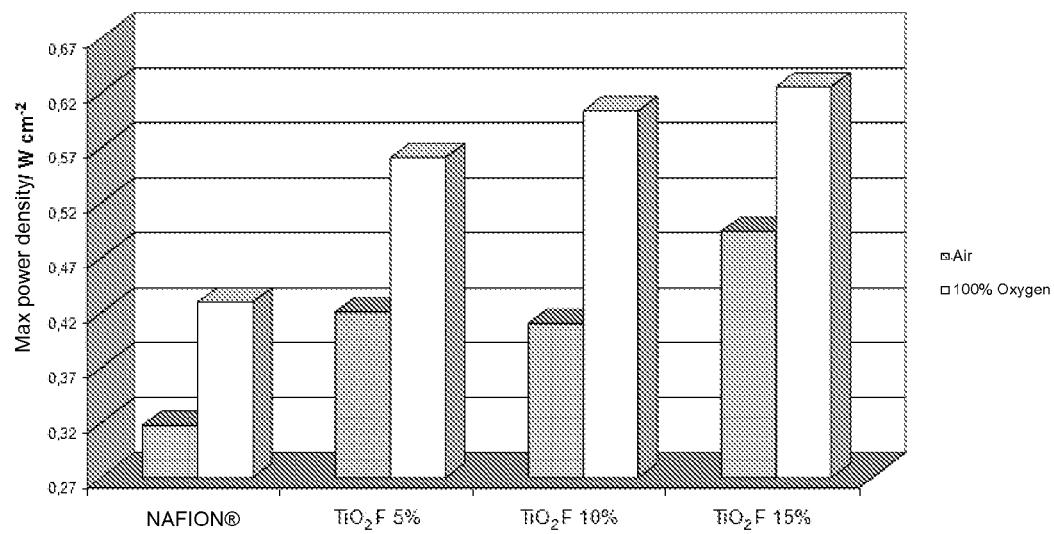
FIG. 9. Maximum power density provided by MEA assembled from the membranes. Reagent pressure 5 bar (g), relative humidity of the reagents 100%. The remaining operating conditions are the same as those shown in the description for FIG. 7.
Figure 10:
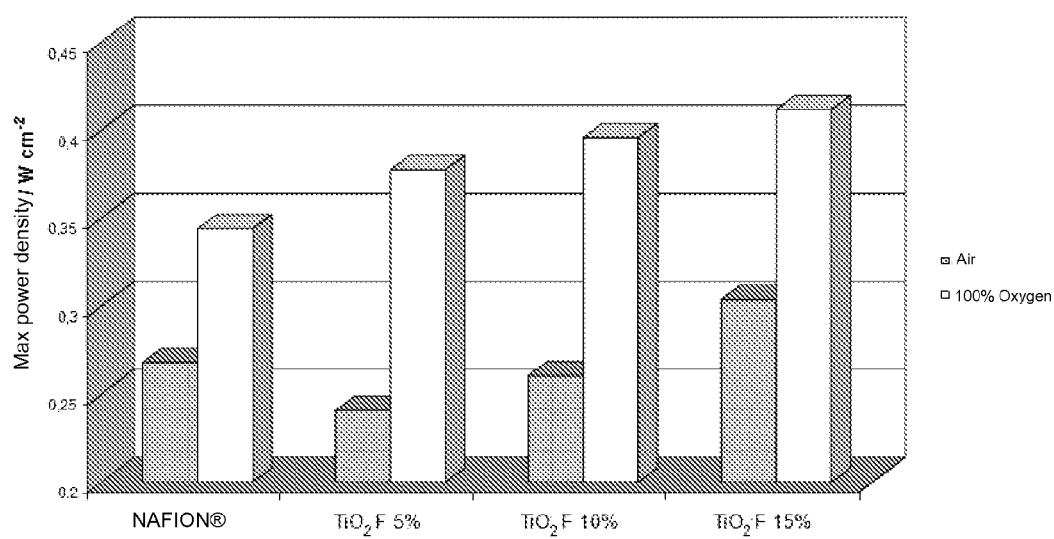
FIG. 10. Maximum power density provided by MEA assembled from the membranes. Reagent pressure 2 bar (g), relative humidity of the reagents 100%. The remaining operating conditions are the same as those shown in the description for FIG. 7.
Figure 11:
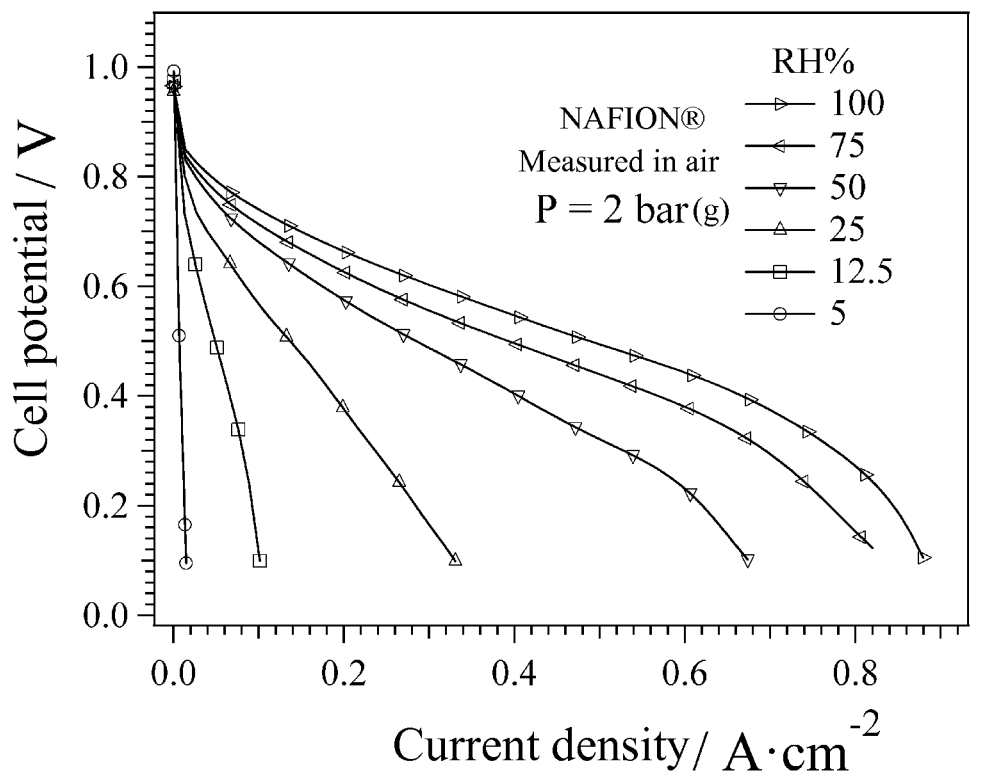
FIG. 11. Polarization curves for the MEA assembled from the pure NAFION® membrane with varying relative humidity of the reagents. Reagent pressure 2 bar (g); the other operating conditions are the same as those shown in the description for FIG. 7.
Figure 11:
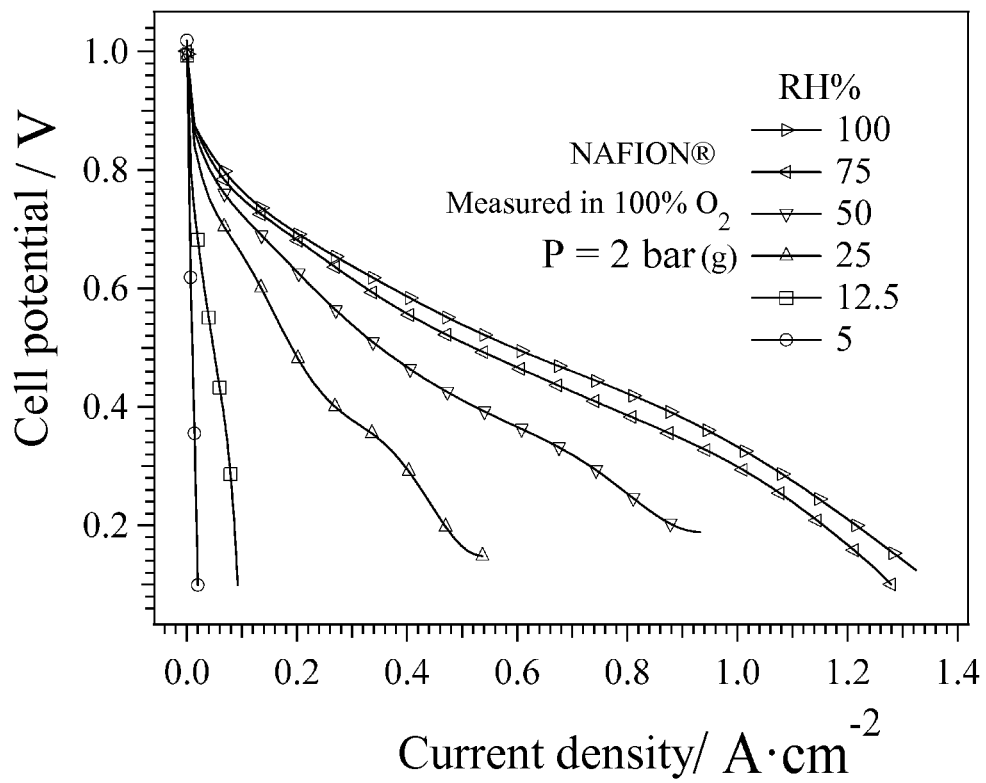
Figure 12:
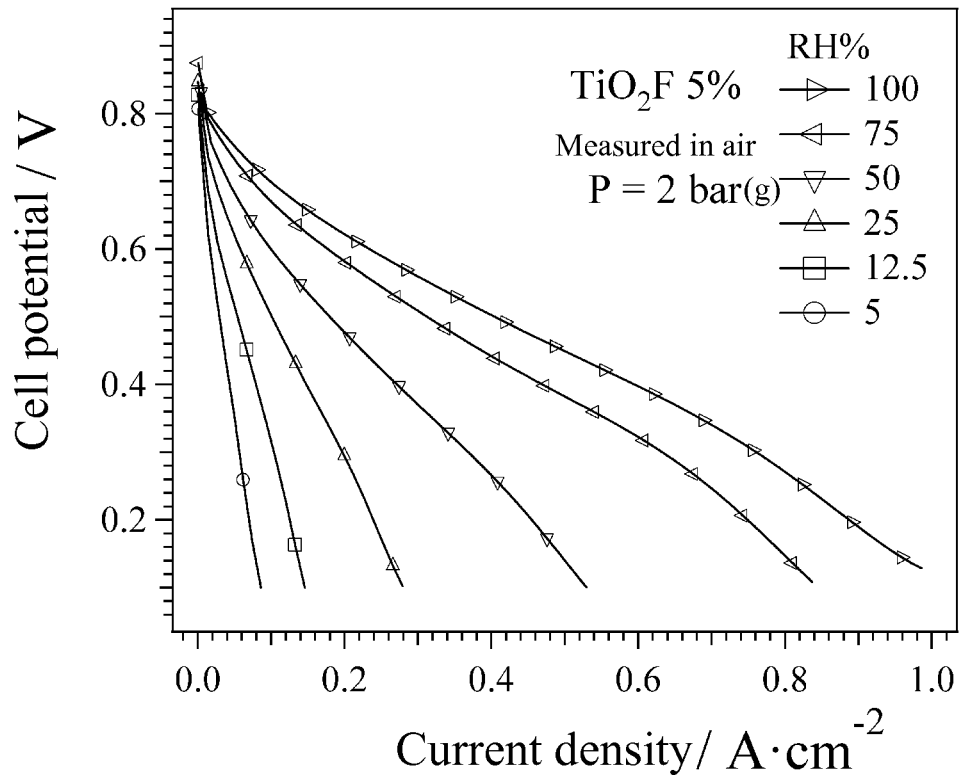
FIG. 12. Polarization curves for the MEA assembled from 5% TiO$_2$F membrane with varying relative humidity of the reagents. Reagent pressure 2 bar (g); the other operating conditions are the same as those shown in the description for FIG. 7.
Figure 12:
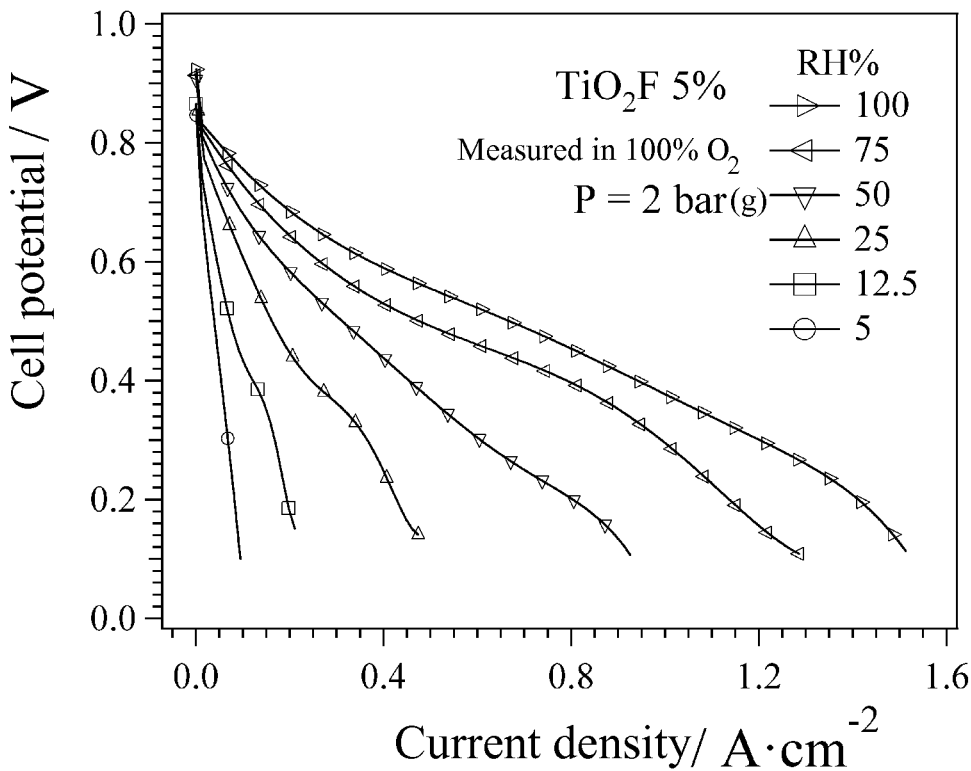
Figure 13:
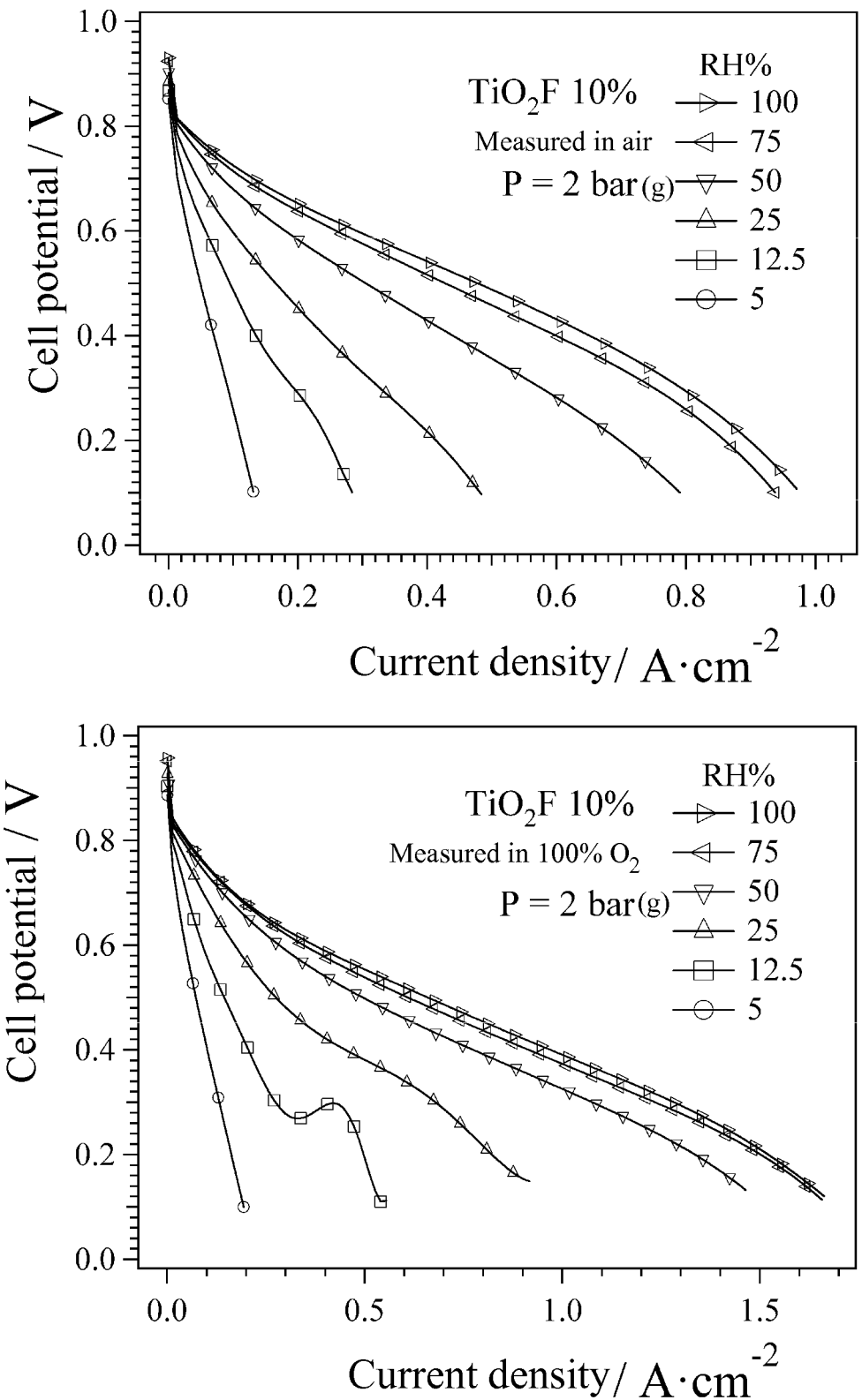
FIG. 13. Polarization curves for the MEA assembled from 10% TiO$_2$F membrane with varying relative humidity of the reagents. Reagent pressure 2 bar (g); the other operating conditions are the same as those shown in the description for FIG. 7.
Figure 14:
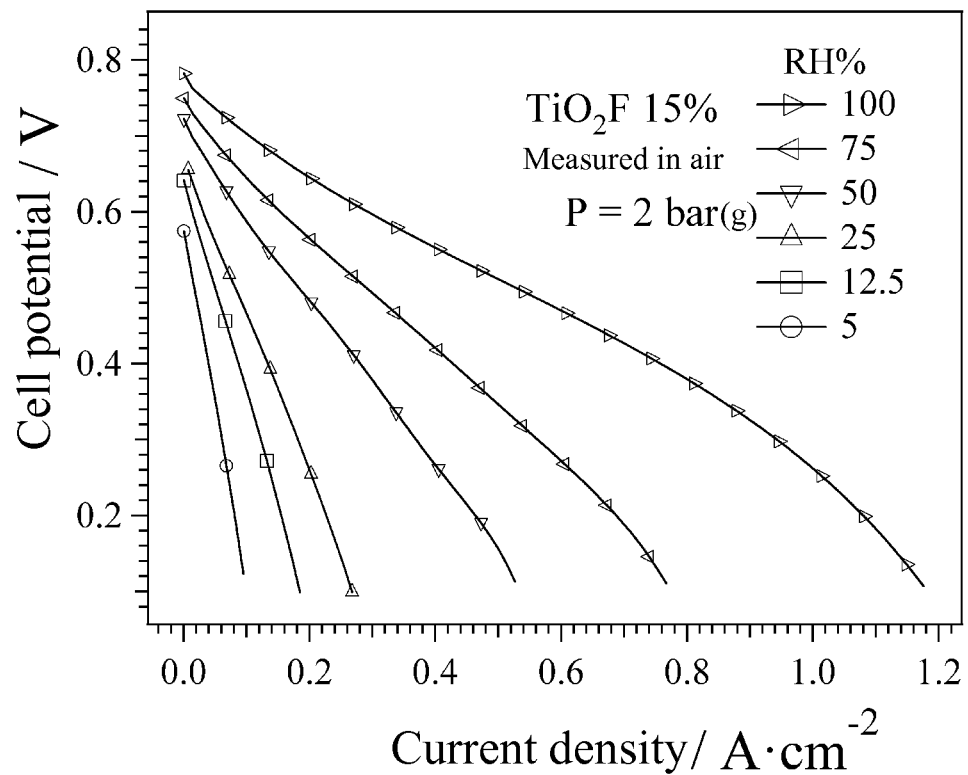
FIG. 14. Polarization curves for the MEA assembled from 15% TiO$_2$F membrane with varying relative humidity of the reagents. Reagent pressure 2 bar (g); the other operating conditions are the same as those shown in the description for FIG. 7.
Figure 14:
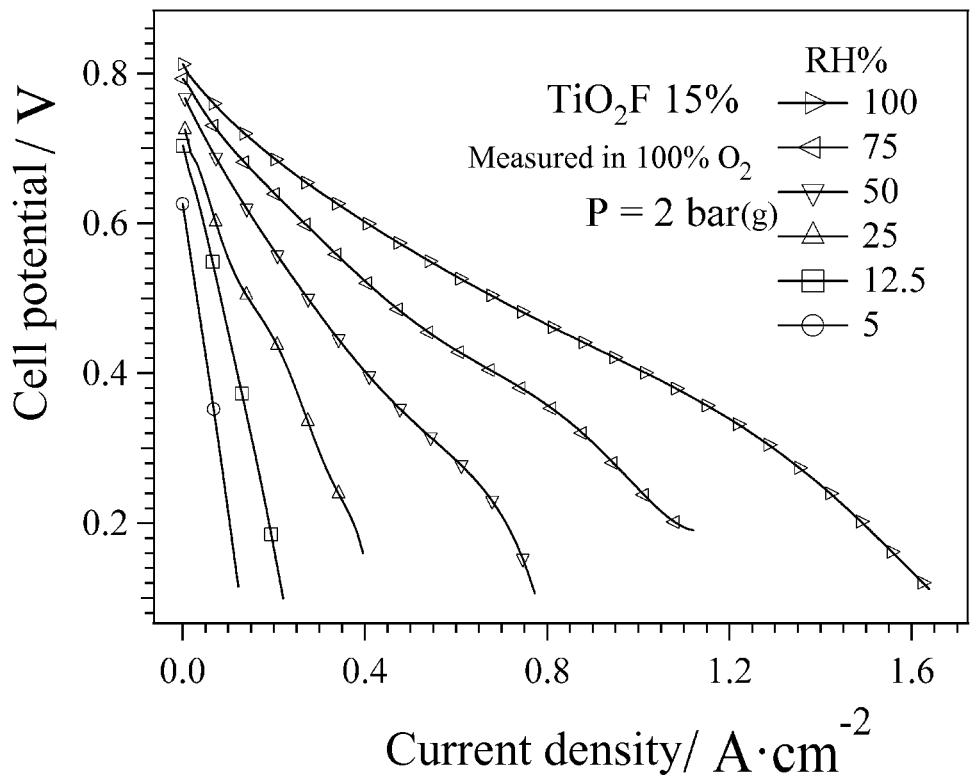
Figure 15:
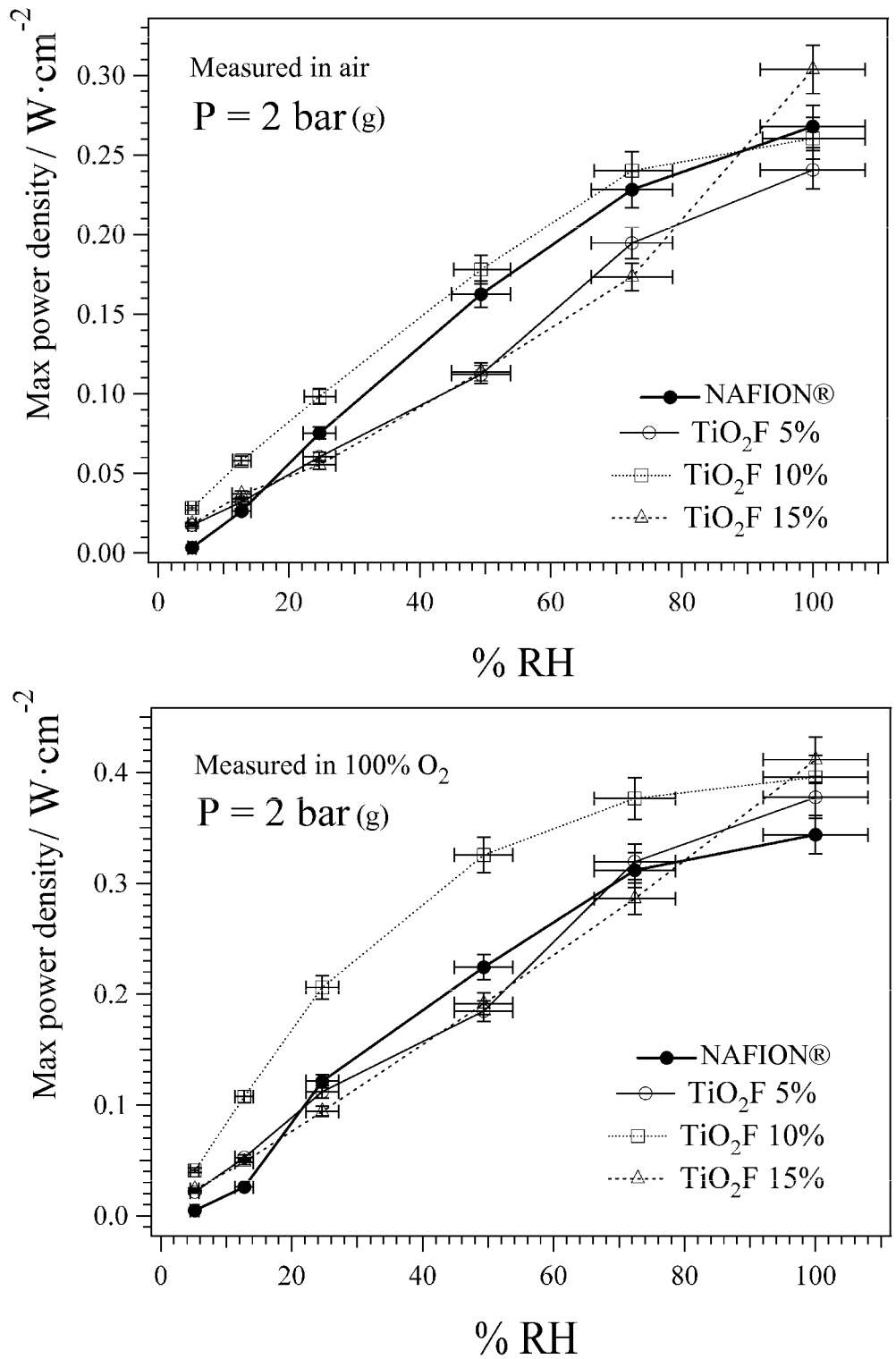
FIG. 15. Change in the maximum power density provided by the various MEA in relation to relative humidity at a reagent pressure of 2 bar (g). The other operating conditions are the same as those shown in the description for FIG. 7.

The invention claimed is:

1. An ion conducting inorganic/organic hybrid membrane comprising fluorine-doped crystalline titanium dioxide particles obtained by a method of preparing ion conducting inorganic/organic hybrid membranes, comprising using fluorine-doped crystalline titanium dioxide particles to prepare ion conducting inorganic/organic hybrid membranes, wherein the fluorine-doped crystalline titanium dioxide particles is in the form of crystalline titanium dioxide particles having an average particle size of between 10 and 500 nm and having fluorine content of between 0.5 and 5% by weight.

2. A fuel cell containing an ion conducting inorganic/organic hybrid membrane of claim 1.

3. An electrolyser containing an ion conducting inorganic/organic hybrid membrane of claim 1.

* * * * *